United States Patent
Ham et al.

(10) Patent No.: US 11,381,413 B2
(45) Date of Patent: Jul. 5, 2022

(54) AUDIO-ORIENTATED IMMERSIVE EXPERIENCE OF AN EVENT

(71) Applicant: Disney Enterprises, Inc., Burbank, CA (US)

(72) Inventors: Katherine H. Ham, West Hartford, CT (US); Jason M. Black, Unionville, CT (US); Eliza D. McNair, West Hartford, CT (US); Jared E. Watterworth, Bristol, CT (US); Natalia X. Pulido, Farmington, CT (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/737,283

(22) Filed: Jan. 8, 2020

(65) Prior Publication Data
US 2021/0211318 A1 Jul. 8, 2021

(51) Int. Cl.
| | |
|---|---|
| *H04L 12/18* | (2006.01) |
| *G08B 6/00* | (2006.01) |
| *H04W 4/06* | (2009.01) |
| *H04W 4/80* | (2018.01) |
| *G08B 3/10* | (2006.01) |

(52) U.S. Cl.
CPC ............ *H04L 12/1895* (2013.01); *G08B 3/10* (2013.01); *G08B 6/00* (2013.01); *H04W 4/06* (2013.01); *H04W 4/80* (2018.02)

(58) Field of Classification Search
CPC ...... H04L 12/1895; H04W 4/06; H04W 4/80; G08B 6/00; G08B 3/10; H04R 5/02; H04N 5/04
See application file for complete search history.

(56) References Cited

U.S. PATENT DOCUMENTS

| | | | | |
|---|---|---|---|---|
| 2009/0114079 A1* | 5/2009 | Egan | .................... | G09B 15/023 84/477 R |
| 2009/0288007 A1* | 11/2009 | Leacock | ................. | H04L 67/38 715/757 |
| 2011/0078571 A1* | 3/2011 | Asbahr | ................. | A63F 13/426 715/716 |
| 2011/0185286 A1* | 7/2011 | Moyers | ............... | H04L 12/1827 715/752 |

(Continued)

OTHER PUBLICATIONS

Reusser et al, (Feeling Fireworks, UIST' 17: Adjunct Publication of the 30th Annual ACM Symposium on User Interface Software and Technology, Oct. 2017, pp. 65-66.

*Primary Examiner* — Lewis G West
(74) *Attorney, Agent, or Firm* — Fay Kaplun & Marcin, LLP

(57) ABSTRACT

The exemplary embodiments are related to a device, system and method for implementing an audio orientated immersive experience of an event presented at a user device. A server is connected to a user device. The server generates a virtual environment that corresponds to a site of an event. The server receives tracking data corresponding to an object of the event. The tracking data is incorporated into the virtual environment. The server identifies a predetermined condition and selects enhancement data based on the predetermined condition. The predetermined condition corresponds to the tracking data and the virtual environment. The server transmits a data stream to the user device, the data stream including the enhancement data.

20 Claims, 4 Drawing Sheets

(56) References Cited

U.S. PATENT DOCUMENTS

| | | | |
|---|---|---|---|
| 2011/0274104 A1* | 11/2011 | Cozzi | H04L 65/608 |
| | | | 370/352 |
| 2012/0254858 A1* | 10/2012 | Moyers | H04L 67/42 |
| | | | 717/177 |
| 2013/0073336 A1* | 3/2013 | Heath | G06Q 30/02 |
| | | | 705/7.29 |
| 2013/0174059 A1* | 7/2013 | Van Wie | H04L 12/1827 |
| | | | 715/757 |
| 2013/0236040 A1* | 9/2013 | Crawford | H04S 7/306 |
| | | | 381/310 |
| 2013/0249948 A1* | 9/2013 | Reitan | G06F 3/04815 |
| | | | 345/633 |
| 2014/0063061 A1* | 3/2014 | Reitan | G09G 5/14 |
| | | | 345/633 |
| 2014/0267906 A1* | 9/2014 | Mickelsen | H04N 5/04 |
| | | | 348/515 |
| 2018/0176945 A1* | 6/2018 | Cao | H04L 1/1822 |
| 2022/0004254 A1* | 1/2022 | Roberts | G06F 3/013 |
| 2022/0020363 A1* | 1/2022 | Vasquez | G10L 15/26 |

\* cited by examiner

AUDIO-ORIENTATED IMMERSIVE EXPERIENCE OF AN EVENT

BACKGROUND INFORMATION

The audio included in the broadcast of an event, such as a sporting event, may be produced by various sources (e.g., announcers, the crowd, the players, etc.). Under conventional circumstances, when audio output is generated at a user device based on audio data included in a broadcast feed, the audio output may lack descriptive and immersive qualities. As a result, a user may have an unsatisfactory experience with the presentation of the event at the user device. Accordingly, there exists a need for a mechanism that enhances the audio output to create a more immersive experience of the event.

DETAILED DESCRIPTION

Figure 1:
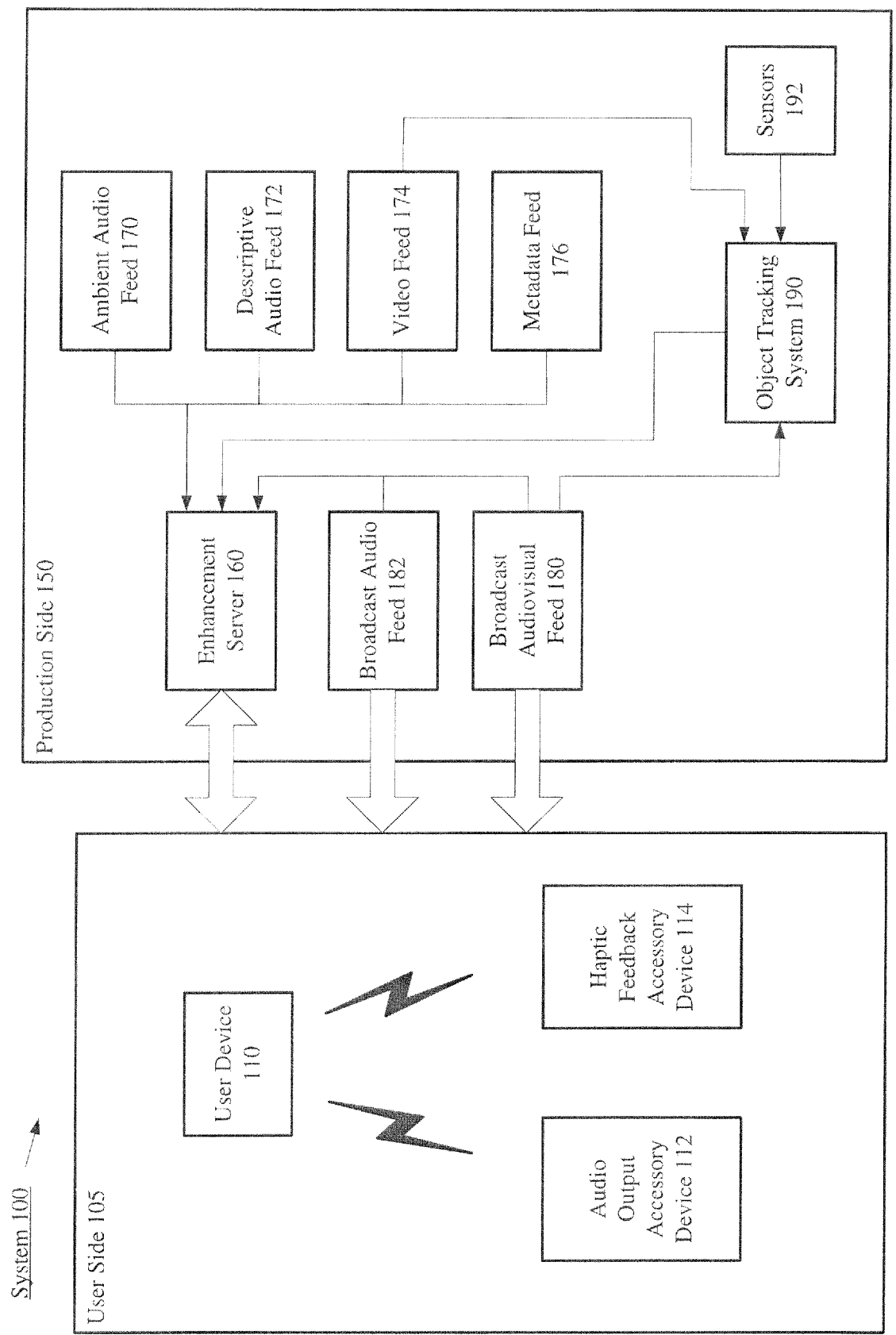
FIG. 1 shows a system for providing an audio-orientated immersive experience according to various exemplary embodiments.

The exemplary embodiments may be further understood with reference to the following description and the related appended drawings, wherein like elements are provided with the same reference numerals. The exemplary embodiments are related to devices, systems and methods for creating an audio-orientated immersive experience of an event via a user device.

The exemplary embodiments are described with regard to a user device that is configured to generate audio output. The user device may also be connected to one or more audio output accessory devices. For example, the user device may be a smartphone and the audio output accessory device may be headphones. However, any reference to the user device being a particular type of electronic device or the audio output accessory device being a particular type of audio output device is merely provided for illustrative purposes. The exemplary embodiments may apply to any arrangement of one or more devices configured to generate audio output.

The exemplary embodiments are also described with reference to the presentation of a live sporting event at the user device. However, the exemplary embodiments are not limited to the presentation of a live sporting event. Throughout this description other examples will be provided. It will be apparent to those skilled in the art that the concepts described herein may be applicable to the presentation of audio data corresponding to any type of real or virtual environment.

The broadcast feed for the event may include audio data representing various sources. For example, the audio data may include an announcer providing commentary of the event, an announcer providing a play-by-play description, the crowd, the gameplay, the players, etc. Thus, the user device may generate audio output based on the audio data included in the broadcast feed.

A server may be configured to provide the user device with enhancement data. As will be described below, the enhancement data may enable the user device to generate an audio-orientated immersive experience. In some embodiments, the enhancement data may include audio data that may provide a descriptive indication of the actions that are occurring during the event. In other embodiments, the enhancement data may include audio data configured to be generated as spatial audio output that makes the user perceive audio output as originating from a particular location. The enhancement data may be selected or generated and then provided to the user device based on the occurrence of a predetermined condition associated with the event. Thus, the user device may generate audio output based on broadcast audio data and audio output based on the enhancement data.

The audio-orientated immersive experience may enhance a visual representation of the event. The audio orientated immersive experience may be configured to make the user feel as if the user was located at the site of the live event or provide information conveying sounds. The information conveying sounds may be realistic (e.g., the sound of a bouncing basketball) or may not be realistic (e.g., cartoon like sound effect). However, the audio-orientated immersive experience does not rely on a visual representation of the event and may be used as an independent presentation of the event. Thus, while the exemplary embodiments may provide a more impactful event experience for all scenarios, the exemplary embodiments may provide even more substantial benefits in scenarios where a visual representation of the event may not be available or feasible. For example, it may not be possible for a visually impaired user to have a satisfactory experience with the conventional presentation of the event and thus, the visually impaired user may benefit from the descriptive and immersive qualities of the exemplary embodiments. In another example, a visual representation of the event may not be available to the driver of a car and thus, the driver may benefit from the descriptive and immersive qualities of the exemplary embodiments. In another exemplary embodiment, the entity providing the immersive audio experience may not have rights to broadcast the video feed of the event. Accordingly, the exemplary embodiments relate to creating an audio orientated immersive experience that makes the user feel as if the user was located at the site of the live event, or provides the user additional information via an enhanced audio experience, regardless of whether a visual representation of the live event is provided.

Further, the exemplary embodiments utilize a universal design approach for the audio-orientated immersive experience of the event. Universal design considers factors such as, equitable use, flexibility in use, simple and intuitive use, perceptible information, size and space for approach and use, tolerance for error and low physical effort. Thus, while the exemplary embodiments may seem tailored towards visually impaired users, the audio-orientated immersive experience may enhance the event experience for any user.

To provide a general example of some of the aspects of the audio-orientated immersive experience from the user perspective, consider the following exemplary scenario in which the event is a basketball game and the user is equipped with the user device and headphones. In a first aspect, the server may select or generate audio data (e.g., enhancement data) based on the occurrence of a predetermined condition. This audio data may be provided to the user device to serve as an indication of an action that occurs during the event. For example, an action that may occur during the basketball game is associated with a particular type of audio output which indicates to the user a particular type of action that occurred during the basketball game. As mentioned above, the user device may receive both broadcast audio data and enhancement data. Thus, the enhancement data may be added to create a more descriptive and immersive experience for the user.

An exemplary sequence of actions may include dribbling from a first location to a second location where an unsuccessful shot attempt hits the rim of a basketball hoop. In this example, dribbling may be associated with audio output that includes sounds that may be perceived as a basketball bouncing on the hardwood of the basketball court. The unsuccessful shot attempt that hits the rim may be associated with audio output that includes a sound that may be perceived as a thud. Accordingly, when a player dribbles from a first location to a second location on the basketball court, the audio output at the user's headphones includes sounds that may be perceived as a basketball bouncing on the hardwood of the basketball court and may be provide in a manner that indicates to the user the location and direction of travel of the ball. When the player performs an unsuccessful shot attempt that hits the rim, the audio output at the user's headphones includes sounds that may be perceived as a thud. Accordingly, based on the audio output corresponding to the enhancement data, the user may be aware of the actions that are being performed by the players of the basketball game.

In a second aspect, audio output may be configured to be perceived by the user as if the user were located at a particular location at the site of the live event. For example, within the context of the basketball game, the user may simulate being located where the midcourt line and the sideline intersect. Relative to this location, a first basketball hoop is located on the left side and a second basketball hoop is located on the right side. The audio output may be configured to be perceived by the user as if the user were located at this location. In the actual basketball game, as a player dribbles from the first basketball hoop towards the second basketball hoop, the audio output at the user's headphones may initially be perceived on the user's left hand side and then transitions across to the user's right hand side. When the player performs an unsuccessful shot attempt that hits the rim of the second basketball hoop, the audio output at the user's headphones is configured to be perceived as a thud originating from the spatial direction of the second basketball hoop relative to the user's simulated location on the basketball court (e.g., right hand side). Accordingly, the exemplary embodiments relate to creating a spatial experience that simulates being located at a particular location within the environment of the event.

The above exemplary scenario is only provided as a general example of some of the aspects of the audio-orientated immersive experience from the user perspective and is not intended to limit the scope of the exemplary embodiments in any way. Further, as mentioned above, the exemplary embodiments are not limited to the presentation of a sporting event and may be applicable to the presentation of audio data corresponding to any type of real or virtual environment.

The exemplary embodiments will be described with regard to operations that are performed on the production side and operations that may be performed on the user side. The operations on the production side may relate to generating and providing a data stream to a user device on the user side. The data stream may enable the user device to provide an audio-orientated immersive experience. The production side operations may be used in conjunction with other currently implemented streaming mechanisms, future implementations of streaming mechanisms or independently from other streaming mechanisms. The operations on the user side may relate to how the user device creates an audio-orientated immersive experience for the user. The user side operations may be used in conjunction with other currently implemented techniques for presenting audio data to a user, future implementations of techniques for presenting audio data to a user or independently from other similar techniques.

The user side and the production side may communicate with one another using one or more networks. For example, the one or more networks may include, but is not limited to, a cellular network, a wireless local area network (WLAN), a personal area network (PAN), a peer-to-peer (p2p) network, a satellite or cable television distribution network, etc. Those skilled in the art will understand the type of connections, association procedures and communication protocols that may be used for communications between the user side and the production side.

FIG. 1 shows a system 100 for providing an audio-orientated immersive experience according to various exemplary embodiments. The system 100 includes a user side 105 and a production side 150.

The user side 105 includes a user device 110, an audio output accessory device 112 and a haptic feedback accessory device 114. The user device 110 may be any type of electronic component that is configured to receive data via a network connection, e.g., a desktop computer, a laptop computer, a mobile phone, a tablet computer, a smartphone, a smart speaker, a phablet, an embedded device, a wearable device, an Internet of Things (IoT) device, a set-top box, a television, a multimedia receiver, a car's infotainment system, etc. Accordingly, the user device 110 may represent any suitable electronic device.

The user device 110 may connect directly with the audio output accessory device 112 and the haptic feedback accessory device 114. The audio output accessory device 112 may be any type of electronic component configured to connect to the user device 110 and generate audio output, e.g., headphones, a speaker, a wearable device, a further user device, etc. The haptic feedback accessory device 114 may be any type of electronic component configured to connect to the user device 110 and generate haptic feedback. Haptic feedback generally refers to using hardware to create physical sensations to communicate with the user. FIG. 1 illustrates the audio output accessory device 112 and the haptic feedback accessory device 114 as being external to the user device 110. However, in an actual system, the audio output accessory device 112 and the haptic feedback accessory device 114 may be included in the user device 110.

Like the user device 110, the audio output accessory device 112 and the haptic feedback accessory device 114 may also communicate directly with the network. Reference to a single user device 110 connected to accessory devices 112, 114 and associated with a single user is merely provided for illustrative purposes. An actual system may include any number of user devices, each connected to any number of accessory devices, associated with any number of users.

The user device 110 and the accessory device 112, 114 may communicate with one another using a wired connection. The user device 110 and the accessory devices 112, 114 may also communicate with one another using a short-range communication protocol, e.g., Bluetooth, WiFi, etc. For instance, if the user device 110 and the accessory devices 112, 114 are within a distance in which the short-range communication protocol may be used, the user device 110 and the accessory devices 112, 114 may exchange data. Thus, the accessory devices 112, 114 may be configured to wirelessly receive data utilizing the short-range communication protocol. In some scenarios, the user device 110 may relay data received from the network to the accessory devices 112, 114 over the short-range communication pathway. In other scenarios, the user device 110 may relay data received the accessory devices 112, 114 over the short-range communication pathway to the network. The user device 110 and the accessory devices 112, 114 may also communicate with each other using their respective network connections.

In this example, the devices on the user side 105 may provide the user with an audio-orientated immersive experience. As indicated above, while the audio-orientated immersive experience may enhance a visual representation of the event, the visual representation of the event is not required. The audio-orientated immersive experience may serve as an independent presentation of the event.

The production side 150 may include an enhancement server 160 that may include one or more communication interfaces to communicate with the components on the production side 150 and the components on the user side 105. The enhancement server 160 may also include one or more processors. The one or more processors may be represented as separate incorporated components of the enhancement server 160 or may be a modular component coupled to the enhancement server 160, e.g., an integrated circuit with or without firmware. For example, the integrated circuit may include input circuitry to receive signals and processing circuitry to process the signals and other information.

The data that drives the audio-orientated immersive experience may be provided to the user side 105, at least in part, by the enhancement server 160. To provide an example, initially, the user device 110 may establish a connection with the enhancement server 160 via one or more network connections. Subsequently, the enhancement server 160 may provide the user device 110 with one or more data streams. The data streams may carry various different types of data including, but not limited to, broadcast data and enhancement data. However, since the enhancement server may provide a data stream of only enhancement data, the enhancement data may be provided by an entity that does not own the rights to broadcast the event. When the entity that does not own the rights provides the enhancement data, the entity may also include near real-time information associated with the live event such as a play-by-play data stream, graphic representation of game actions or animations, etc.

Throughout this description "broadcast data" refers to multimedia data that originates from a broadcast feed of the event. The multimedia data may comprise one or more of video, audio, text, graphics, animations, a play-by-play description, etc. In some embodiments, the enhancement server 160 may receive broadcast data and incorporate the broadcast data into a data stream. In other embodiments, the enhancement server 160 may receive broadcast data, modify the broadcast data and incorporate the modified broadcast data into a data stream. In further embodiments, the enhancement server 160 may not send any broadcast data to the user device 110. Instead, the user device 160 may receive broadcast data directly from a broadcast feed and use both the enhancement data received from the enhancement server 160 and the audio data received from the broadcast feeds to provide the audio-orientated immersive experience.

Throughout this description "enhancement data" may refer to a type of data that is generated or selected based on data corresponding to the live event and is configured to cause the user device 110 to perform an operation related to the audio-orientated immersive presentation of the event. In this example, enhancement data may represent audio data, data related to generating haptic feedback, data that may be used to generate audio output, data that may indicate to the user device 110 that audio data stored locally at the user device 110 is to be used to generate audio output or any other appropriate type of data.

The production side 150 may include a broadcast audiovisual feed 180 and a broadcast audio feed 182. The broadcast audiovisual feed 180 may represent a combination of audio data and video data broadcast to the public (e.g., television broadcast, a live stream over the Internet, etc.). The broadcast audio feed 182 may represent audio data broadcast to the public (e.g., radio broadcast, a live stream the Internet, etc.). A person of ordinary skill in the art will understand how the audiovisual feed 180 and the audio feed 182 may be delivered to the user side 105.

The enhancement server 160 may also receive the broadcast audiovisual feed 180 and the broadcast audio feed 182. In a first aspect, the broadcast data may be used by the enhancement server 160 to identify a predetermined condition corresponding to the event. Based on the predetermined condition, enhancement data may be generated or selected by the enhancement server and then provided to the user device 110. In a second aspect, the enhancement server 160 may send modified or unmodified broadcast data to the user device 110. For example, the enhancement server 160 may provide a data stream that includes both enhancement data and broadcast data to the user device 110. Thus, the user device 110 may receive broadcast data (modified or unmodified) from the broadcast audio visual feed 180, the broadcast audio feed 182 from the enhancement server 160 or from any other appropriate source and enhancement data from the enhancement server 160.

Operations performed by the enhancement server 160 may be performed using various different types of data received from various different sources. In addition to the audiovisual broadcast feed 180 and the descriptive audio feed 182, the data sources may include an ambient audio feed 170, a descriptive audio feed 172, a video feed 174, a metadata feed 176 and an object tracking system 190. Thus, the enhancement server 160 may be equipped with a one or more communication interfaces to communicate with the user device 110, the audiovisual broadcast feed 180, the descriptive audio feed 182, the feeds 170-176, the object tracking system 190 and any other component which may transmit data to or receive data from the enhancement server 160.

The ambient audio feed 170 may include audio data that represents ambient noise from the event such as, crowd noise, noise from the playing field, the sidelines, the players, etc. The descriptive audio feed 172 may include audio data that represents an audio description of the event such as, commentary, play-by-play analysis, a description intended for an audio-only presentation, a description intended for visually impaired users, etc. The ambient audio feed 170 and the descriptive audio feed 172 may be analog or digital, recorded from a single source (e.g., microphone, audio input device) or multiple sources and may be statically recorded or dynamically produced (e.g., by a director of the live event). The ambient audio feed 170 and the descriptive audio feed 172 may be delivered from the live event or a remote production facility to the enhancement server 160 by any means known in the art for delivering an audio feed.

The video feed 174 may include video data that represents the event. The video data may be analog or digital and may be recorded by a single source (e.g., camera) or by multiple sources. When multiple sources are used to record the event, the video data may include video data from all of the sources or may be selectively switched among sources (e.g., by a director of the event switching cameras). The video feed 174 may be delivered from the live event or a remote production facility to the enhancement server 160 by any means known in the art for delivering a video feed.

The metadata feed 176 may include metadata associated with the event. In the context of a sporting event, metadata may include event data such as game score, time remaining, team statistics, individual player statistics, game situation, etc. The metadata feed 176 may be delivered from the live event or a remote production facility to the enhancement server 160 by any means known in the art for delivering a metadata.

One or more of the ambient audio feed 170, the descriptive audio feed 172, the video feed 174 and the metadata feed 176 may be used to broadcast the event. Thus, in certain scenarios, the enhancement server 160, broadcast audiovisual feed 180 and the broadcast audio feed 182 all receive data from feeds originating from the same location or entity.

Additionally, reference to a separate ambient audio feed 170, descriptive audio feed 172, video feed 174 and metadata feed 176 is only provided for illustrative purposes. Any two or more of the feeds 170-176 may also be transmitted in a single feed.

The object tracking system 190 may collect tracking data associated with one or more objects of the event from any of a variety of sources. The objects may represent a person (e.g., player, referee, coach, etc.) or object (e.g., equipment, ball, puck, etc.) located at the event site. The object tracking system 190 is shown as being external to the enhancement server 160, however, this is only for illustrative purposes. Throughout this description, various operations described with regard to the object tracking system 190 may alternatively be performed at the enhancement server 160.

In some embodiments, the object tracking system 190 may collect the tracking data based on identifying and tracking objects using video data. The video data may be provided by the broadcast audiovisual feed 180, the video feed 174 or video data captured by a different source. The exemplary embodiments are not limited to any particular type of technique for tracking objects using video data. A person of ordinary skill in the art would understand how objects may be tracked using video data.

In other embodiments, the object tracking system 190 may collect the tracking data from sensors 192 located at the live event. There are various different types of sensors that may be used. For example, a sensor may track an RFID chip located on an object (e.g., a player, a uniform, equipment, the ball) to collect location data corresponding to the object. However, the exemplary embodiments are not limited to any particular type of technique for tracking objects using a sensor. A person of ordinary skill in the art would understand how objects may be tracked using sensor.

Figure 2:
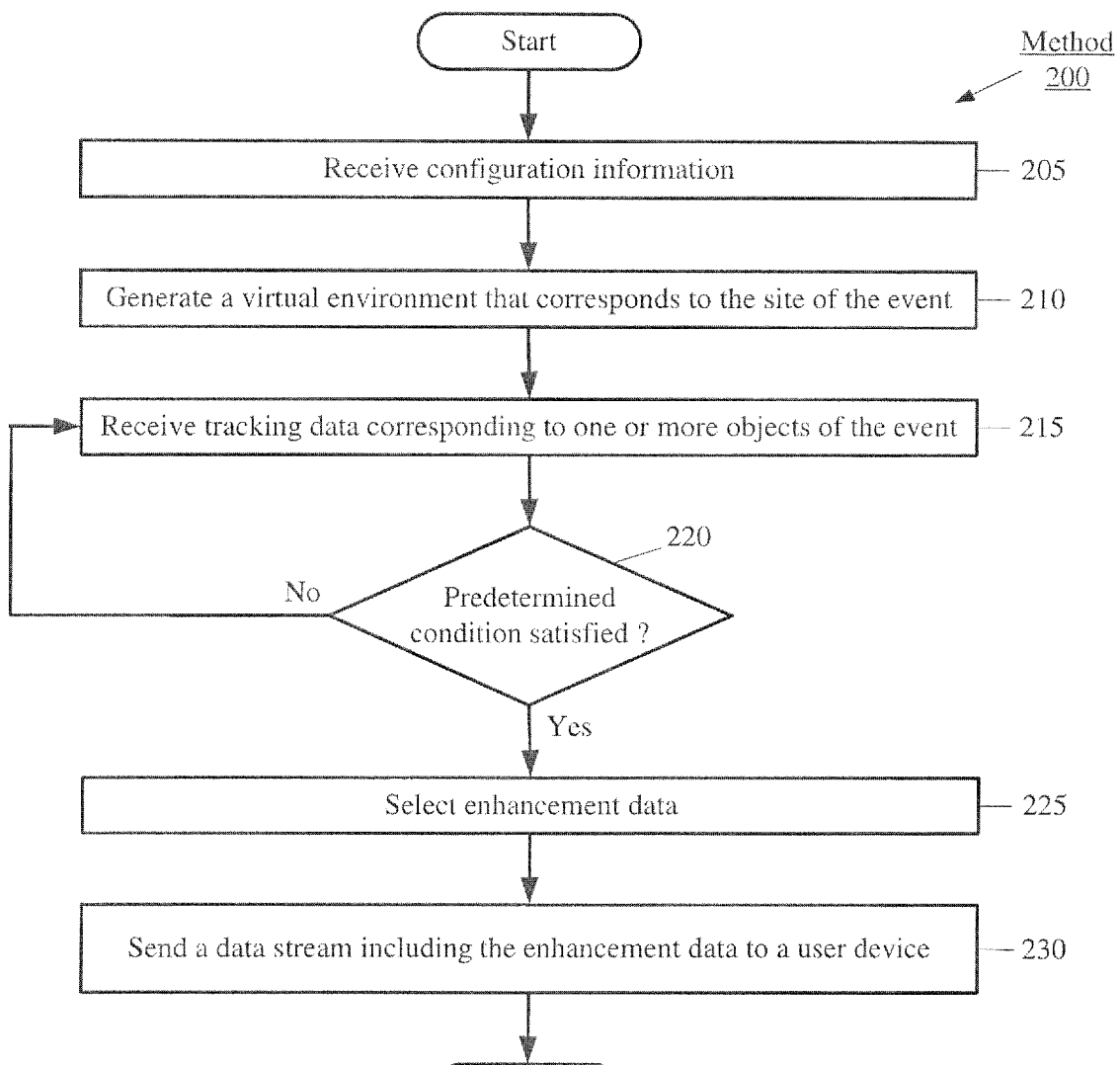
FIG. 2 shows an exemplary method for the enhancement server providing a data stream including enhancement data according to various exemplary embodiments.

FIG. 2 shows an exemplary method 200 for the enhancement server 160 providing a data stream including enhancement data according to various exemplary embodiments. The method 200 will be described with regard to the system 100 of FIG. 1.

In 205, the enhancement server 160 receives configuration information. The configuration information may relate to characteristics of the presentation of the audio-orientated immersive experience.

In a first aspect, the configuration information may relate to the type of audio output that is to be presented to the user to indicate the occurrence of an action during the event. For example, continuing with the basketball scenario provided above, the configuration information may indicate to the enhancement server 160 that audio data for a sound that may be perceived as a basketball hitting the hardwood of the court is to be provided to indicate that the basketball in the actual event hits the hardwood of the court and audio data for a sound that may be perceived as a thud is to be provided to indicate that the basketball in the actual event hits the rim. Further examples include, a made basket may be associated with a sound that may be perceived as a swish, a player moving may be associated with a sound that may be perceived as shoes squeaking, a blocked shot may be associated with a sound that may be perceived as a hand swatting the ball, etc. The type of audio output is not required to be a realistic representation of the action in the event and may be set to any type of sound including words or phrases, music, sound effects, etc. Any reference to a particular type of audio output is merely provided for illustrative purposes and is not intended to limit the exemplary embodiments in any way. For each event, any type of action may be associated with any type of audio output.

In a second aspect, the configuration information may relate to one or more feeds (e.g., broadcast audiovisual feed 180, broadcast audio feed 182, ambient audio feed 170, descriptive audio feed 172, video feed 174, etc.) that are to be included as part of the audio-orientated immersive experience. As will be explained below, this type of configuration information may indicate to the enhancement server 160 one or more feeds that are to be forwarded to the user side 105 or how a feed is to be modified before being sent to the user side 105. In some embodiments, the user side 110 may receive a feed from a source other than the enhancement server 160, e.g., broadcast audiovisual feed 180, broadcast audio feed 182. Thus, the configuration information may also indicate to the enhancement server 160 which feed the enhancement data may be presented with at the user device 110 regardless of the entity that is to provide the feed to the user device 110.

In a third aspect, the configuration information may relate to any location at the event. This location may be any location at the site of the live event. For example, the user may select a seat at the venue or a location on the playing surface. This information may indicate to the enhancement server 160 that audio output should be perceived by the user relative to this location. The enhancement server 160 may use this location information when generating enhancement data or when modifying a feed of the event.

The configuration information may be received by the enhancement server 160 as default settings, as user input on the production side or as user input at the user device 110. To ensure that the user is aware of the audio output that will be provided and has the option to alter the configuration information, an orientation procedure may be performed. During this procedure, the enhancement server 160 may describe to the user at the user device 110 what the audio-oriented immersive experience may include. For instance, continuing with the basketball scenario, the enhancement server 160 may provide an audio clip to the user device 110 that include the sound of a basketball hitting the hardwood of the court and inform the user that this sound means a player is dribbling the ball. Similarly, an audio clip may be provided that includes the sound of a thud and the enhancement server 160 may indicate to the user that this sound indicates that a player in the game has shot the ball and hit the rim. In addition to the type of sounds the user may hear, the orientation procedure may include a training step for acclimating the user to the spatial aspect of the audio orientated immersive experience. For example, the enhancement server 160 may provide an audio clip that explains that sounds that are perceived on the user's left side indicate action near the home team's basket and sounds that are perceived on the user's right side indicate action near the away teams basket. During operation, an orientation procedure may be initiated in response to a predetermined event such as the end of a quarter or half. This may ensure the user is aware of any changes to the spatial aspect of the audio orientated immersive experience caused by a change in the game such as the home and away team's basket. The above examples are merely provided for illustrative purposes, the orientation procedure may be performed in any appropriate manner.

In 210, the enhancement server 160 may generate a virtual environment that corresponds to the site of the event. For instance, continuing with the basketball scenario, the enhancement server may generate a virtual representation of the venue including the basketball court. The virtual environment may include a three-dimensional coordinate system (x,y,z). In this example, the coordinates (0, 0, 0) may represent a center point on the surface of the basketball court. However, this is merely provided for illustrative purposes, the exemplary embodiments may utilize any appropriate coordinate system.

In some embodiments, the virtual environment may be modeled and rendered in 210. In other embodiments, the enhancement server 160 may have access to a virtual environment model previously generated for the site of the live event and may then render the virtual environment for the operations performed in the method 200 using the model previously generated.

In 215, the enhancement server 160 may receive tracking data corresponding to one or more objects of the event. This tracking data may be input into the virtual environment with three-dimensional coordinates. The three-dimensional coordinate system and the three-dimensional coordinates may be used to determine the actions that are occurring in the actual event. To provide an example, as a player in the actual event dribbles from one end of the court to another, tracking data corresponding to the player and tracking data corresponding to the basketball may be collected and incorporated into the virtual environment. When the tracking data corresponding to the ball includes a coordinate associated with the surface of the basketball court (e.g., $y=0$), this may indicate to the enhancement server 160 that in the actual event the basketball has hit surface of the court. The corresponding x coordinate of the tracking data may indicate where with the bounds of the court the ball has hit the surface. When the tracking data corresponding to the player includes a first coordinate point at a first time (e.g., $x=0$) and a second coordinate point at a second time (e.g., $x=5$), this may indicate to the enhancement server 160 that the player has moved from the center of the court towards a particular end of the court.

In 220, the enhancement server 160 determines whether a predetermined condition is satisfied. The predetermined condition may indicate to the enhancement server that enhancement data is to be provided to the user device 110. The enhancement server 160 may be configured to monitor for any of a variety of different types of predetermined conditions based on any of a variety of different factors. If the predetermined condition is not satisfied, the method 200 returns to 215 to continue to monitor for a predetermined condition. If the predetermined condition is satisfied, the method 200 continues to 225.

In one example, the predetermined condition may be based on the tracking data and the virtual environment. For instance, certain points on the coordinate system may be associated with certain aspects of the site of the event. In this example, a y coordinate equal to 0 (or within a certain threshold to 0) may represent the surface of the court, various x coordinates may indicate the perimeter of the court and a first set of x, y, z coordinates may represent a first basketball hoop and a second set of x, y, z coordinates may indicate the second basketball hoop. When the tracking data of any object is incorporated into the virtual environment and corresponds to a coordinate that represents an aspect of the site of the live event, this may indicate that an action of interest has occurred (e.g., the ball has hit the ground, gone out of bounds, hit the rim, etc.) Thus, the enhancement server 160 may determine that audio data corresponding to these types of actions is to be provided to the user device 110.

The enhancement server 160 may also monitor for predetermined conditions corresponding to a different type of data. For example, when event data shows that the score of a game is tied, this may indicate to the enhancement server 160 that enhancement data configured to trigger haptic feed at the user device 160 is to be provided to the user device 110. In another example, when the event data shows that the game clock or another similar temporal aspect of the game is at a particular state, the enhancement data may be configured to trigger haptic feedback or generate audio output that indicates to the user the state of the corresponding temporal aspect (e.g., the game clock may soon expire, within two-minutes to the end of the quarter/half/game, etc.). To provide a further example, the enhancement data may be configured to generate distinguishing audio output corresponding to a first team using a first audio pitch and distinguishing audio output corresponding to a second team using a second audio pitch. This may allow the user to differentiate which team performed an action. For instance, continuing with the basketball example, when the team that is losing makes a basket the audio output (e.g., the sound of the swish) may be configured to be output at a low pitch and when the team that is winning makes a basket the audio output may be configured to be output at a high pitch. As the lead increases, the difference in pitch may increase and as the lead decreases the difference in pitch may decrease. This not only allows the user to identify the team performing the action but may also indicate the significance of a particular action on the actual game. The above examples are provided for illustrative purposes, the exemplary embodiments may apply to a predetermined condition that is based on any appropriate type of data corresponding to the event.

In 225, the enhancement server 160 selects enhancement data. The enhancement data may be based on the predetermined condition detected in 220 and the configuration information received in 205. To provide an example, the user has requested to simulate as if the user was located at a certain position at the live event. This configuration information along with the tracking data is incorporated into the virtual environment. When the tracking data indicates that an action is occurring at a certain point within the virtual environment, an audio clip is selected (e.g., a thud, a swish, a cartoon sound effect, etc.) This audio clip may then be configured based on the user's simulated location so that at the user device the audio output is perceived as if the user was located at the simulated location. Thus, if the home team made a basket the audio clip may be perceived as if it was originating from the side of the user corresponding to the home team's basket. This example is merely provided for illustrative purposes and is not intended to limit the exemplary embodiments in any way. As mentioned above, the enhancement data may represent audio data, data related to generating haptic feedback, data that may be used to generate audio output, data that may indicate to the user device 110 that audio data stored locally at the user device 110 is to be used to generate audio output or any other appropriate type of data.

The enhancement data may be generated by the enhancement server 160, retrieved from a storage location on the production side 150, trigger the user device 110 to generate audio output using audio data stored on the user side 105 or may be audio data collected from the event and then modified. Continuing with the basketball scenario, the enhancement data may be audio data corresponding to the identified action (e.g., dribble, hitting the rim, etc.). In some embodiments, the enhancement data is an audio clip stored on the production side 150 and accessible by the enhancement server 160.

In other embodiments, the enhancement data is audio data collected from the event and configured to be perceived with a certain magnitude relative to the other audio presented to the user. That is, instead of the faint sound of a basketball hitting the court that may be perceived in the conventional broadcast of an event, the sound of the basketball hitting the court is collected from the event and configured to be perceived at a greater magnitude such that the user can clearly hear the audio indicative of the basketball hitting the hardwood.

The enhancement server 160 may configure the audio data that is to indicate that an action has occurred in the live event to be output within a particular frequency range. The enhancement server 160 may also prevent any other audio data from using that frequency range. This increases the likelihood that the user is able to perceive the audio output associated with an action in the live event over the other audio output included in the presentation of the event. For example, the enhancement server 160 may configure a set of audio data to be output at a first frequency range. The enhancement server 160 may configure other audio data to be output at a frequency range that is not within the first frequency range or may provide the user device 110 with instructions regarding filtering other audio from being output within this first frequency range. Since the set of audio output is the only audio output within the first frequency range the user may more clearly perceive this audio output.

As indicated above, in some embodiments the enhancement data may be configured to generate haptic feedback at the user device 110 or the haptic feedback accessory device 114. In other embodiments, the enhancement data may be spatial audio data configured to be perceived as if the user was located at the location indicated in the configuration information of 205. Thus, the enhancement data may represent any type of data sent to the user device 110 that is intended to enhance the event experience for the user.

In 230, the enhancement server 160 sends a data stream including enhancement data to the user device 110. The enhancement data may be synchronized with other audio or video data that is included in this data stream, another data stream provided to the user device 110 by the enhancement server 160 or with a feed provided from different source. Synchronization may be performed on the production side 150 or may include data that enables the user device 110 to synchronize the enhancement data with other data from the event.

During the broadcast of the event, there may be scenarios in which there is no action of interest occurring at the site of the event and the available broadcast data is limited. For example, conventionally, when a replay is presented to the user side during the broadcast of the event, there may be no action of interest occurring at the site of the event and the only audio provided may be of announcers commenting on the replay. This conventional presentation may rely on the visual representation provided in the broadcast. To ensure that these types of scenarios do not cause an unsatisfactory audio-orientated immersive experience, the enhancement server 160 may be configured to provide enhancement data during a replay. This may include, identifying the onset or occurrence of a replay, retrieving audio data related to the action (e.g., enhancement data, ambient audio, descriptive audio, etc.) that is the subject of the replay and providing it to the user device 110.

To ensure that the user knows the context of the event, enhancement data may include audio data that describes the current context of the event. For example, this audio data may include the time remaining, the score, the players on the court or any other appropriate context information. This audio data may be provided to the user device 110 based on a schedule, a timer, the occurrence of a predetermined condition at the event, user input on the production side 150, user input on the user side 105, etc. During operation, the enhancement server may generate this audio data using the event data received from the metadata feed 176, the broadcast audiovisual feed 180 or any other appropriate source.

Figure 3:
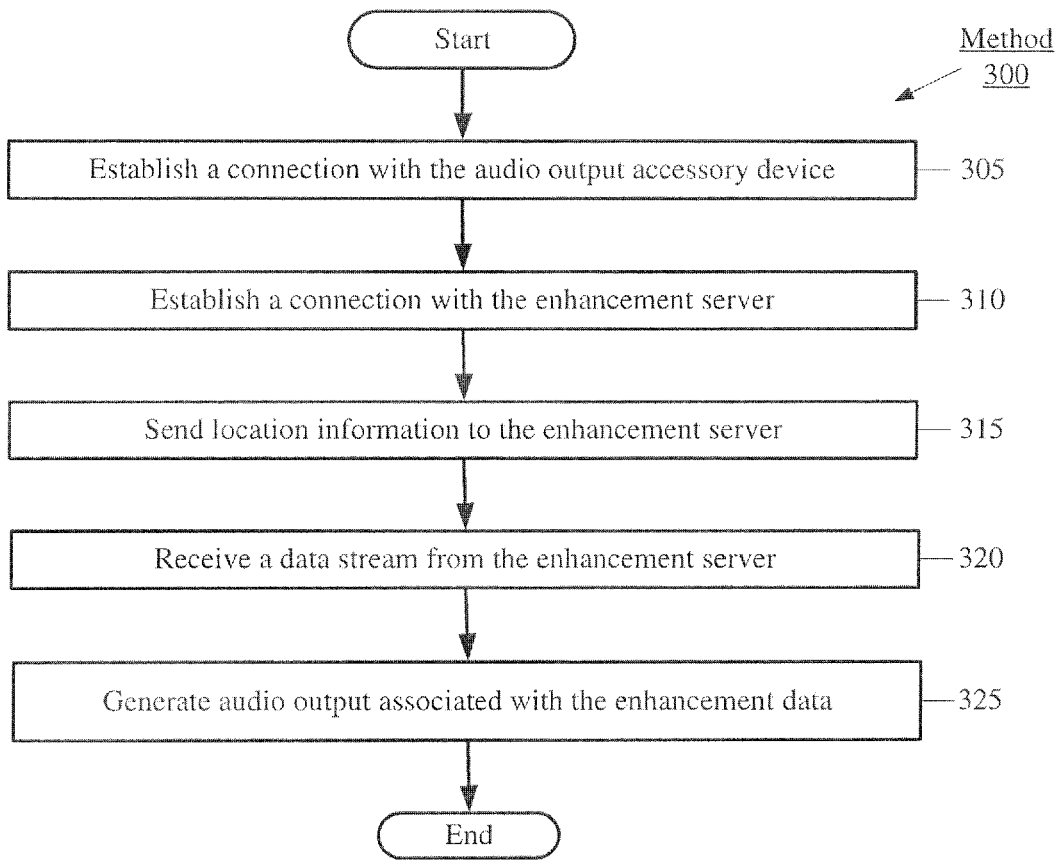
FIG. 3 shows an exemplary method for generating an audio-orientated immersive experience at a user device according to various exemplary embodiments.

FIG. 3 shows an exemplary method 300 for generating an audio-orientated immersive experience at a user device 110 according to various exemplary embodiments. The method 300 will be described with regard to the system 100 of FIG. 1.

In 305, the user device 110 establishes a connection with the audio output accessory device 112. As mentioned above, in some embodiments, the audio output accessory device 112 may be headphones. In other embodiments, the audio output accessory device 112 may be a surround sound system. The exemplary embodiments are not limited to any particular audio output device and may apply to any arrangement of one or more devices configured to generate audio output.

In 310, the user device 110 establishes a connection with the enhancement server 160. For example, the user device 110 may utilize a user-facing application or a web browser to access an internet protocol (IP) address for the enhancement server. Those skilled in the art will understand the type of connections that may facilitate communication between the user device 110 and the enhancement server 160.

In 315, the user device 110 sends location information (e.g., the location in the venue from which the user would like to experience the event) to the enhancement server 160. As mentioned above, the location information may be provided to the enhancement server 160 as configuration information during the orientation procedure. However, the exemplary embodiments are not limited to this scenario and may apply to the user device 110 providing the location information to the enhancement server 160 in any appropriate manner.

In 320, the user device 110 receives a data stream from the enhancement server 160. The data stream may include enhancement data. In some embodiments, the data stream may also include broadcast data or modified broadcast data. In other embodiments, the user device 110 receives a broadcast feed from a different source, e.g., broadcast audiovisual feed 180, broadcast audio feed 182, etc. The enhancement data may be synchronized with the broadcast data or the modified broadcast data on the production side 150 prior to it being received by the user device 110 or the user device 110 may be configured to synchronize the enhancement data with other data.

In 325, the user device 110 or the audio output accessory device 112 generates audio output associated with the enhancement data. Thus, the user device 110 may receive the enhancement data from the enhancement server 160 and forward it to the audio output accessory device 112 via a short-range communication protocol. Audio output is then generated by the accessory device 112. The audio output may be configured to be perceived spatially, as if the user was located at the location indicated in the location information.

The exemplary embodiments are not limited to a basketball game. The enhancement data may be used to generate an audio-orientated immersive experience for the presentation of any type of multimedia data. For example, the enhancement data may be used to provide a more impactful event experience associated with a dance routine or competition. The enhancement data in this scenario may trigger audio output that is intended to indicate to the user when the dancer's feet hit the ground. In another example, the enhancement data may accompany an audio book. The enhancement data in this scenario may be configured to indicate to the user the actions that are being described in the book or location of different speakers to create a more impactful audio book presentation.

The user device 110 may also be connected to a haptic feedback accessory device 114. Based on the enhancement data, the user device 110 may cause the haptic feedback accessory device 114 to generate haptic feed. Like, the audio output accessory device 112, the haptic feedback accessory device 114 may receive data from the user device 100 via the short-range communication protocol. To provide an example, the haptic feedback accessory device 114 may be a board that is configured to be held by the user. The board may generate haptic feedback using motors, water jets or any other appropriate hardware. The haptic feedback may provide the user with a physical sensation that describes what is happening in the live event. For example, continuing with the basketball scenario, haptic feedback may be generated when the crowd noise at the event reaches a certain threshold, when players collide, when a basket is made or when a ball hits the rim. There may also be haptic feedback that corresponds to movement of one or more object at the event. Thus, the user may be able to feel where the players are located on the court and where they are moving on the court based on the haptic feedback accessory device 114.

Figure 4:
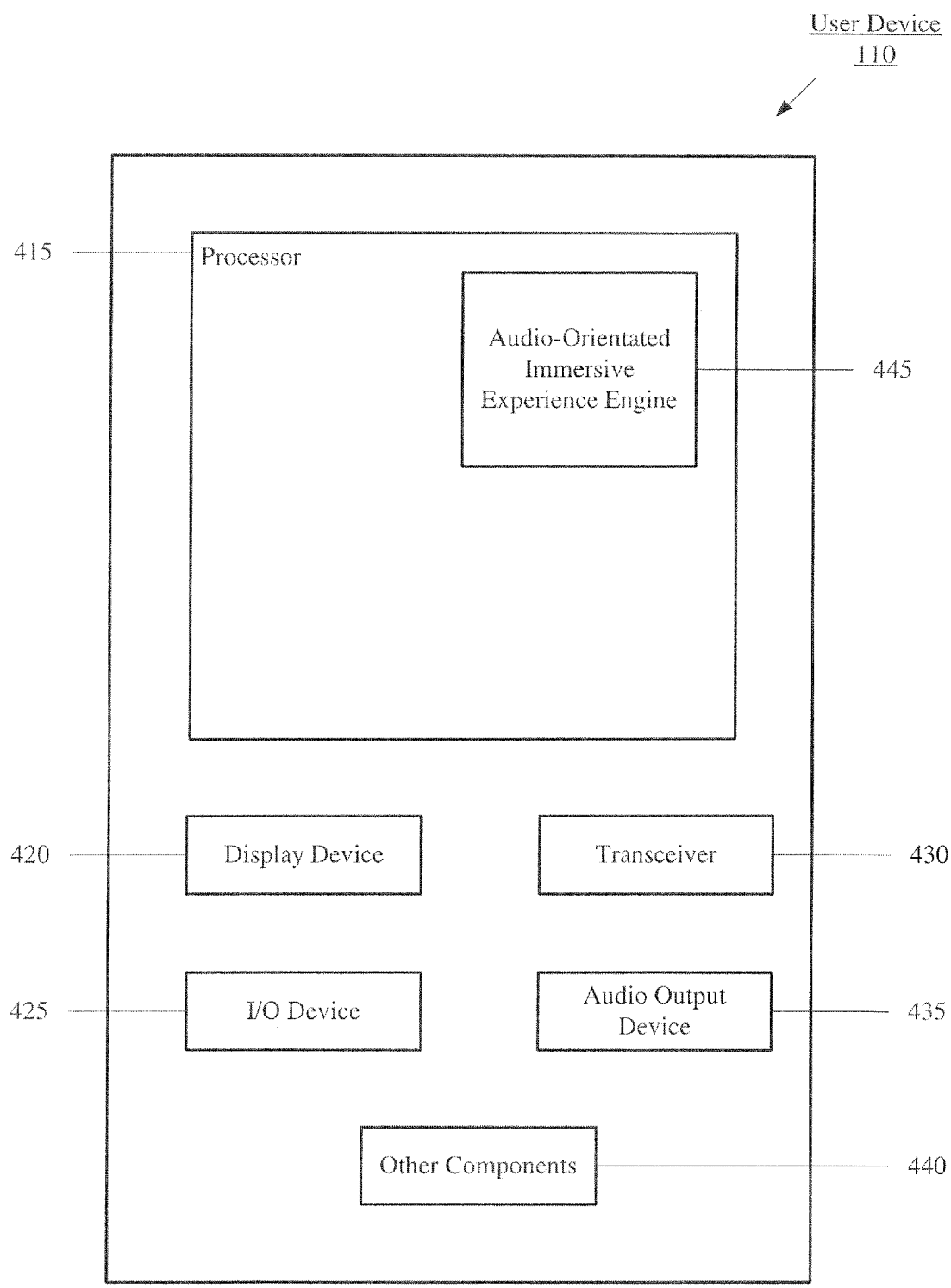
FIG. 4 shows an exemplary user device according to various exemplary embodiments.

FIG. 4 shows an exemplary user device 110 according to various exemplary embodiments. Those skilled in the art will understand that the user device 110 may be any type of electronic component that is configured to execute software or firmware, e.g., a desktop computer, a mobile phone, a tablet computer, a smartphone, phablets, embedded devices, wearable device, Internet of Things (IoT) devices, etc. Accordingly, the user device 110 may represent any electronic device.

The user device 110 may include a processor 415, a display device 420, an input/output (I/O) device 425, a transceiver 430, an audio output device 435 and other components 440. The audio output device 435 may represent one or more components configured to generate audio output, e.g., one or more speakers, headphones, etc. In some embodiments, the audio output device 345 may be a component internal to the user device 110. In other embodiments, the audio output device 345 may be external to the user device 110 and connected via a wired or wireless connection. Those skilled in the art would understand the procedures and protocols that may be utilized by the audio output device 345 and the user device 110 to establish and maintain a connection. The other components 440 may include, for example, an audio input device, a battery, a data acquisition device, ports to electrically connect the user device 110 to other electronic devices, ports that provide a wired connection to an internet protocol (IP) based network, hardware configured to generate haptic feedback, etc.

The processor 415 may be configured to execute a plurality of applications of the user device 110. For example, the applications may include an audio-orientated immersive experience engine 445. In a first aspect, the audio-orientated immersive experience engine 445 may manage communications with the enhancement server 160. In a second aspect, the audio-orientated immersive experience engine 445 may manage how the enhancement data and broadcast data is presented to the user. In some embodiments, the operations described above with regard to the audio-orientated immersive experience engine 445 may be performed on the network side (e.g., the enhancement server 160). In this type of configuration, the user device 110 may receive data and information that is already configured to be generated as output at the user device 110 or any connected accessory devices.

The audio-orientated immersive experience engine 445 being executed by the processor 415 is only exemplary. The functionality associated with the audio-orientated immersive experience engine 445 may also be represented as separate incorporated components of the user device 110 or may be a modular component coupled to the user device 110, e.g., an integrated circuit with or without firmware. For example, the integrated circuit may include input circuitry to receive signals and processing circuitry to process the signals and other information. In addition, in some user devices, the functionality described for the processor 415 is split among two or more processors. The exemplary embodiments may be implemented in any of these or other configurations of a user device.

The display device 420 may be a hardware component configured to display data or other information to a user while the I/O device 425 may be a hardware component that enables the user to enter inputs. The display device 420 and the I/O device 425 may be separate components or integrated together such as a touchscreen. The transceiver 430 may be a hardware component configured to establish a connection with a wireless network.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows platform, a Mac platform and MAC OS, a Linux based OS, a mobile device having an operating system such as iOS, Android, etc. In a further example, the exemplary embodiments of the above described method may be embodied as a computer program product containing lines of code stored on a computer readable storage medium that may be executed on a processor or microprocessor. The storage medium may be, for example, a local or remote data repository compatible or formatted for use with the above noted operating systems using any storage operation.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A method, comprising:
   at an enhancement server connected to a user device:
   rendering a three-dimensional model of a virtual environment that corresponds to a site of an event, wherein the three-dimensional model of the virtual environment includes a three-dimensional coordinate system;
   receiving configuration information corresponding to characteristics of the event;
   receiving tracking data corresponding to an object of the event, the tracking data of the object being independent of the location of the user device;
   inputting the tracking data into the three-dimensional model of the virtual environment;
   identifying a predetermined condition within the three-dimensional model of the virtual environment based on the three-dimensional coordinate system and the tracking data;
   selecting enhancement data based on the predetermined condition and the configuration information;
   transmitting a data stream to the user device, the data stream including the enhancement data.

2. The method of claim 1, wherein the predetermined condition is based on at least i) the three-dimensional coordinate system and ii) the tracking data.

3. The method of claim 1, wherein the enhancement data is audio data that is configured to generate audio output that indicates an action that occurred during the event.

4. The method of claim 1, wherein the enhancement data is configured to cause the user device to generate haptic feedback.

5. The method of claim 1, further comprising:
   receiving an indication of a location corresponding to the event,
   wherein the enhancement data is spatial audio data that is configured to generate audio output that is to be perceived spatially relative to the location.

6. The method of claim 1, further comprising:
   receiving a request for event data from the user device, wherein the enhancement data includes audio data that is configured to generate audio output that includes a description of the event data.

7. The method of claim 1, wherein the data stream further includes broadcast data.

8. The method of claim 1, wherein the enhancement data is synchronized with a broadcast feed of the event.

9. The method of claim 1, wherein the tracking data is based on tracking objects using video data or based on tracking objects using sensors deployed at the event.

10. The method of claim 1, wherein the enhancement data includes audio data that is recorded at the event.

11. A method, comprising:
    at a user device connected to an enhancement server:
    transmitting location information to the enhancement server, the location information corresponding to a location at a site of an event, wherein the site of an event corresponds to a three-dimensional coordinate system included in a three-dimensional model of a virtual environment rendered by the enhancement server;
    receiving a data stream from the enhancement server, the data stream including enhancement data associated with the location information and configuration information related to characteristics of the event; and
    generating audio output based on the enhancement data, the audio output configured to be perceived spatially relative to the location at the site of the event.

12. The method of claim 11, wherein generating the audio output includes transmitting the audio data to an accessory device via a short-range communication protocol.

13. The method of claim 11, wherein the audio output indicates an action that occurred during the event.

14. The method of claim 11, wherein the data stream further includes enhancement data that is configured to generate haptic feedback.

15. The method of claim 11, wherein the data stream further includes broadcast data.

16. The method of claim 11, wherein the enhancement data is synchronized with a broadcast feed of the event.

17. The method of claim 11, wherein the audio output includes a description of the event data.

18. The method of claim 11, wherein the enhancement data corresponds to an object of the event.

19. The method of claim 11, wherein the enhancement data includes audio data that is recorded at the event.

20. An enhancement server, comprising:
    a communication interface; and
    a processor configured to perform operations, the operations comprising:
    rendering a three-dimensional model of a virtual environment that corresponds to a site of an event, wherein the three-dimensional model of the virtual environment includes a three-dimensional coordinate system;
    receiving configuration information corresponding to characteristics of the event;
    receiving tracking data corresponding an object of the event, the tracking data of the object being independent of the location of the user device;
    inputting the tracking data into the three-dimensional model of the virtual environment;
    identifying a predetermined condition within the three-dimensional model of the virtual environment based on the three-dimensional coordinate system and the tracking data;
    selecting enhancement data based on the predetermined condition and the configuration information; and
    transmitting a data stream to the user device, the data stream including the enhancement data.

* * * * *